(No Model.)
W. A. TIPSON.
PIPE JOINING DEVICE.
No. 518,556.  Patented Apr. 17, 1894.
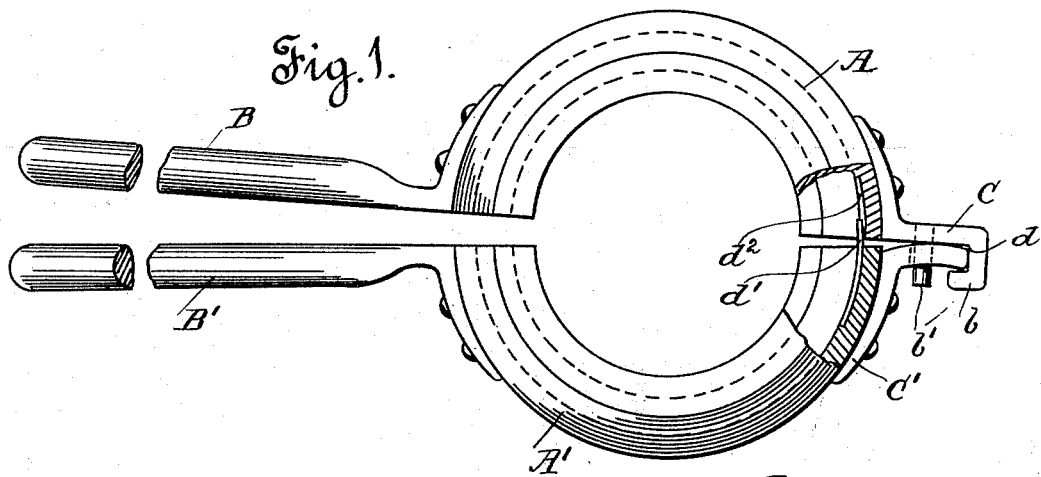
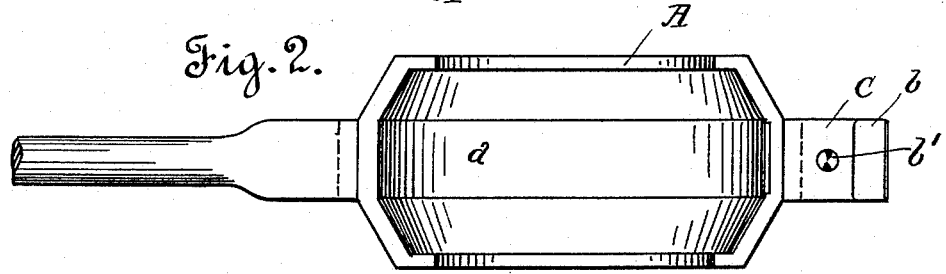
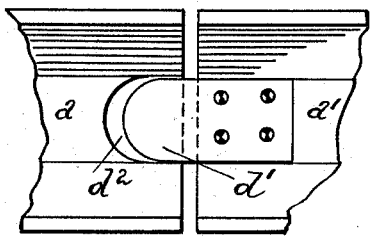
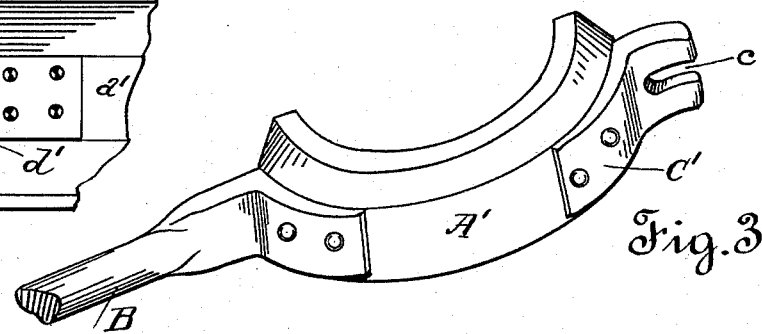
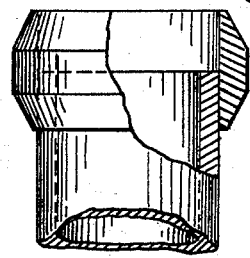
Witnesses.
F. Monteverde.
M. G. Loefler.
Inventor.
William A. Tipson
By N. A. Acker
atty
THE NATIONAL LITHOGRAPHING COMPANY,
WASHINGTON, D. C.

UNITED STATES PATENT OFFICE.

WILLIAM A. TIPSON, OF SAN FRANCISCO, CALIFORNIA, ASSIGNOR TO THE PACIFIC ASPHALTUM PIPE COMPANY, OF CALIFORNIA.

PIPE-JOINING DEVICE.

SPECIFICATION forming part of Letters Patent No. 518,556, dated April 17, 1894.

Application filed May 29, 1893. Serial No. 475,833. (No model.)

*To all whom it may concern:*

Be it known that I, WILLIAM A. TIPSON, a citizen of the United States, residing at San Francisco, in the county of San Francisco and State of California, have invented certain new and useful Improvements in Pipe-Joining Devices; and I do hereby declare the following to be a full, clear, and exact description of said invention, such as will enable others skilled in the art to which it most nearly appertains to make, use, and practice the same.

My present invention relates to an improved implement for joining together the ends of pipes, more especially such as are composed of asphaltum or bitumen, while the same are being laid, thus permitting the use of collars for this purpose being dispensed with, which consists in the arrangement of parts and details of construction, as will be hereinafter more fully set forth and described.

Heretofore it has been customary to form the pipe with end collars and connect the ends of the pipes by allowing the collar to overlap the ends of the pipe and cementing the same thereto. In the laying of asphaltum or similar pipe this mode of joining the ends is not practical for the reason that the collar when cemented will not rigidly adhere to the end of the pipe, consequently causing leakage thereof. Again the collar when formed integral with the pipe becomes easily broken or damaged during handling or transportation.

The object of my invention is to provide a device whereby the ends of the pipe may be united or joined during the laying thereof, thus saving the expense attached to the making of collars which have to be stored away until ready for use.

In order to more fully understand my invention, reference must be had to the accompanying sheet of drawings, wherein similar letters of reference denote corresponding parts.

Figure 1, is a plan view of the device. Fig. 2, is an elevation showing one-half or section of the device. Fig. 3, is a perspective view showing the opposite section to that shown in Fig. 2, looking at the outside thereof. Fig. 4, is an inside broken top plan of the device when open; and Fig. 5, a detail showing collar formed upon one section of the pipe.

My device consists of the two sections, A, A', each, preferably, formed semi-circular in shape, and having the interior face thereof cut away so as to provide the channel portions $a$, $a'$, into which the material for making the union collar is placed. Said sections are provided with the handles B, B', which may be cast integral therewith or made separate and bolted thereto, as shown in the drawings, Figs. 1 and 3. The section A, has bolted thereto and rearwardly projecting therefrom the clip C, which has its outer end bent so as to form the hook $b$. This constitutes the male section of the lock-joint for the sections A, A'. This male section of the lock-joint has projecting therefrom the pin or stud $b'$. The opposite section A', of the joiner, has secured thereto the plate C', which plate is slotted, as shown at $c$, within which slotted portion fits the pin or stud $b'$. This plate constitutes the female portion of the lock-joint.

If so desired the male and female portions of the lock-joint may be cast integral with the sections A, A', but I prefer to make the same separate, likewise the handles, so that in case either becomes broken, the same may be easily repaired without destroying the entire device. It will thus be seen that I provide a male and female section to the implement. When the device is closed the lug or pin $b'$, fits within the slotted portion of plate C', which constitutes the female section, when made integral with section A', the end of which bears against wall $d$, of hooked end $b$, of clip or plate C.

The inner face of groove or channel $a$, is countersunk, as shown at $d^2$, into which fits the tongue $d'$, secured within and projecting beyond the channel or groove $a'$. This tongue serves as a cutter for the material placed within the channels or grooves $a$, $a'$, when the two sections A, A' are brought together, and prevents the surplus material from crowding into the lock-joint.

When it is desired to join or unite the two sections of pipe, the device is used as follows: The ends of the pipe sections are brought together so as to abut one against the other, and one section of the joining device, say section A, is passed beneath the two ends of the pipe sections. The channel formed therein as well as the channel formed in the opposite section of the device, is filled with soft or pliable asphaltum, bitumen or other cementing material, and the sections brought together, which surround the outer surfaces of the pipes.

Inasmuch as the material locked within the channel by the forming device is in a heated condition, it is obvious that when the two half-sections are brought together, it will complete or form a perfect collar and being in this heated condition will hermetically seal to the ends of the pipe sections. The shape of the collar thus formed will depend altogether upon the shape given to the grooves $a$, $a'$, of the sections A, A'. Owing to the leverage given thereto by the handles it is obvious that the material which forms the collar may be subject to great pressure. This manner of securing or joining the ends of the pipes together I find preferable to that of sweating the collar thereon, for the reason that a much better jointure between the ends is formed.

Having thus described my invention, what I claim as new, and desire to secure protection in by Letters Patent of the United States, is—

As a new article, a device for joining the ends of pipes, consisting of two half-semi-circular sections, each section provided with an internal groove or channel, of the male and female sections of the lock-joint secured to each respectively, of the pin or stud projecting from the male section which fits within a groove formed within the female section when the two are placed together, and of the handles for closing the sections of the device.

In testimony whereof I affix my signature in presence of two witnesses.

WILLIAM A. TIPSON.

Witnesses:
N. A. ACKER,
LEE D. CRAIG.